Feb. 14, 1967 L. TAVAN 3,303,839
VENTILATED COOKING STOVE UNIT
Filed June 1, 1965 3 Sheets-Sheet 1
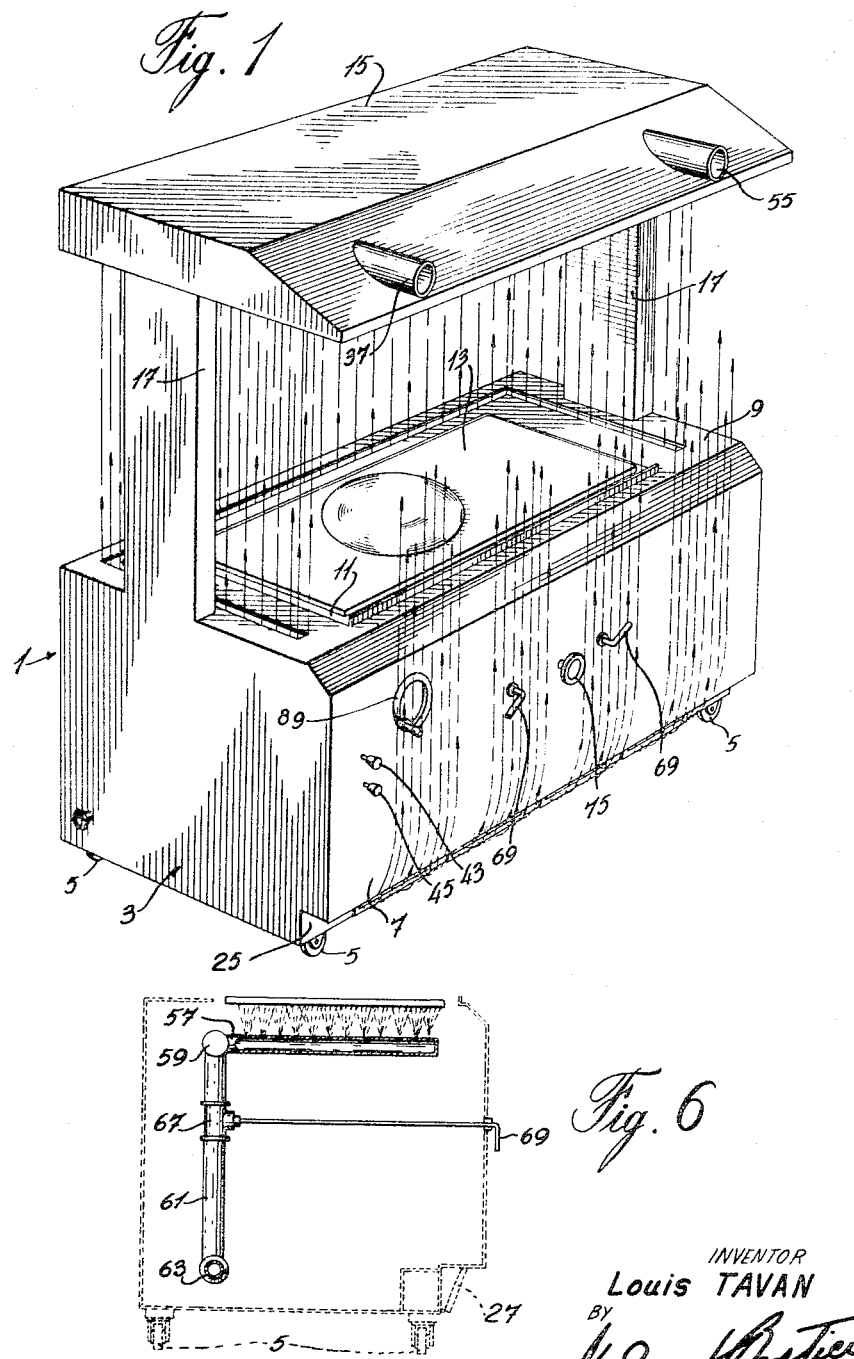
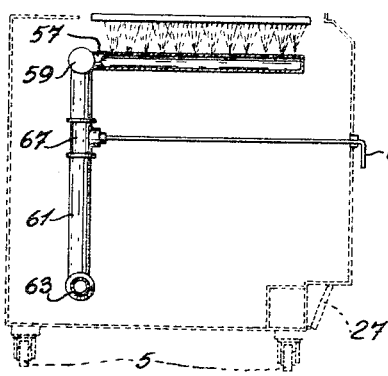
INVENTOR
Louis TAVAN
BY
ATTORNEYS

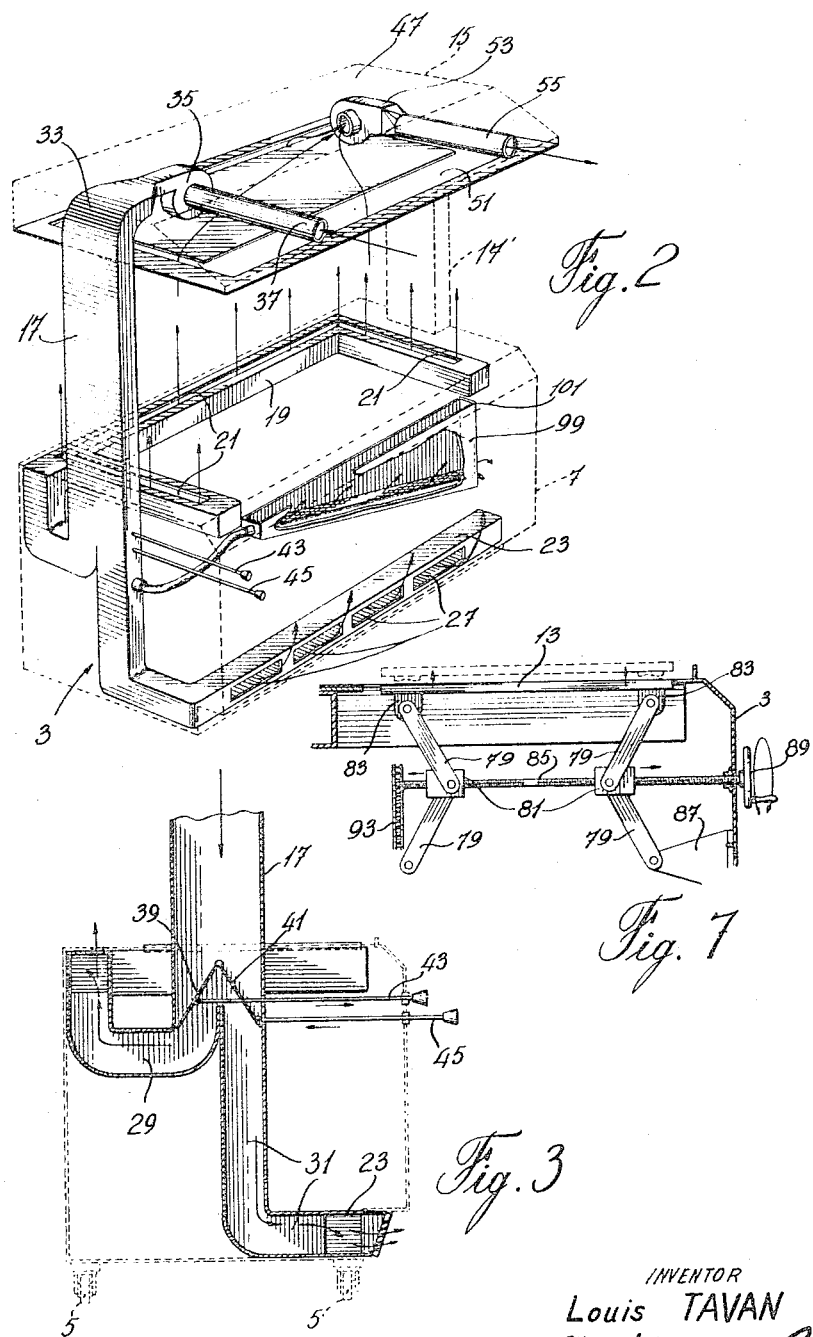

INVENTOR
Louis TAVAN 3,303,839
VENTILATED COOKING STOVE UNIT
Louis Tavan, 289 Bloomfield Ave., Outremont,
Quebec, Canada
Filed June 1, 1965, Ser. No. 460,184
4 Claims. (Cl. 126—299)

This invention relates to a ventilated cooking stove unit and more particularly to a unit of this type adapted to be moved from place to place.

In the development of the food catering business, there is an increasing need for a compact and self sufficient temporary food making and preserving installation that can easily be transported and that can readily be put into service at the intended place of use while being as unobstructive as possible in regard to volume, cleanliness and odor.

A main object of the invention lies in the provision of such a cooking unit that can be used either in transit such as for serving a single meal during a convention or for a more extended period of time but still on a temporary basis.

Still another object of the invention is to provide a cooking unit of the above type that can be easily moved from place to place and thus serve for food catering. Also, the cooking unit of the invention is provided with suitable ventilation, that is, it is especially adapted to prevent heat generated by the cooking plate to escape in the immediate surrounding area of the unit where it would indispose people waiting to be served or would overheat the room into which the unit is installed, particularly if installed in a relatively small place.

Yet another object of the invention lies in the provision of a cooking unit having means to create an air curtain all around the hot cooking plate whereby to retain the heat and odors within the space created by the air curtain and control and direct the heat and odors at a more convenient location than in the immediate surrounding of the unit.

It is also an object of the invention to provide within this unit the necessary heating equipment as well as the necessary removal facilities for pastry cuttings and other waste left over from the cooking.

Generally, the invention which lies in a ventilated cooking stove unit comprises a base; a horizontal cooking plate at the top of said base; a hood spaced above and over the top of the base; first duct means on the base having opening means through a wall thereof surrounding the cooking plate; second duct means on the hood having opening means of an outline generally corresponding to the outline of the opening means of the base and located thereover; forced air means to blow air in one of the duct means and to withdraw air from the other of the duct means so as to create around the hot plate an air stream between the duct means; the size and location of the two duct means being such that the air stream actually forms an air curtain around the hot plate to prevent the heat generated thereby to escape away from the curtain and to be carried away by the forced air means at a suitable location.

It is believed that a better understanding of the invention will be afforded by the following detailed description of a specific embodiment thereof having reference to the appended drawing wherein:

FIG. 1 is a perspective view of the cooking stove movable unit of the invention illustrating the air curtain created around the cooking plate;

FIG. 2 is a perspective of the air conveying means of the invention;

FIG. 3 is a vertical cross-sectional view of part of the air duct means at one end of the unit;

FIG. 6 is an elevation view, partly in cross-section, of the gas heating installation of the cooking unit of the invention;

FIG. 7 is a side elevation view of the hot plate moving means of the unit;

Figure 5:
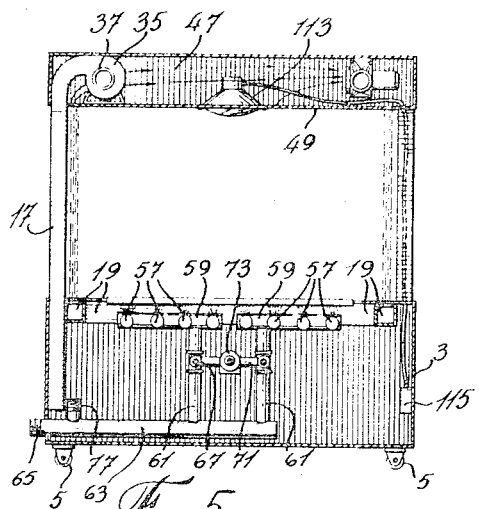
FIG. 5 is a longitudinal cross-sectional view of the unit.

As shown in the drawing, the unit 1 of the invention is formed with a base 3 mounted on a series of wheels 5 whereby to be easily moved from one place to another.

For appearance purposes and also for convenience in storing material and various cooking implements, the base 3 is preferably completely closed and formed with a front wall 7 and a top wall 9, the latter having an opening 11 for the passage of a cooking plate 13. It will of course be understood that any other type of cooking means may be mounted on base 3.

A hood 15 is mounted above and over top wall 9, being supported by columns 17 and 17'.

Referring now particularly to FIG. 2, the unit comprises a first duct means formed by a U-shaped conduit 19 surrounding three sides of cooking plate 13. Conduit 19 has opening means 21, which may be in the form of an elongated slot opening through the top face thereof, and a straight conduit 23 located at the foot of base 3 and inwardly of the front wall 7. It will be noted, particularly from FIG. 1, that base 3 is recessed near the bottom and at the front thereof to define a foot space 25, the straight conduit 23 having a series of openings 27, defining the opening means therefor, and facing forwardly of the unit.

Column 17 is hollow and merges, at the bottom thereof, into branching air ducts 29 and 31, the former leading into the U-shaped conduit 19 while the latter projects beyond to connect with the straight conduit 23. Column 17, which incidentally is preferably made of sheet metal along with the remaining part of the unit, bends at the top into an air conveying means 33 connected with the outlet of an air blower 35 having an inlet pipe 37.

Air valves 39, 41 are provided at the junction of the branching air ducts 29, 31 and are separately controlled by means of sliding handles 43, 45, the operation of which will, as can be gathered, control the amount of air sent separately to the two parts of the first duct means.

Hood 15 is hollow to define chamber 47 of the second duct means having a horizontal bottom wall 49 through which are formed the opening means of the said second duct means which may be one or several openings 51 disposed in the form of a rectangle and generally above the opening means 21 of the U-shaped conduit of the first duct means as well as above the straight conduit 23.

An exhaust fan 53 having an exhaust pipe 55 is mounted in chamber 47 to withdraw air through opening means 51. It will also be noted that air blower 35 is preferably mounted in chamber 47, for convenience.

Figure 4:
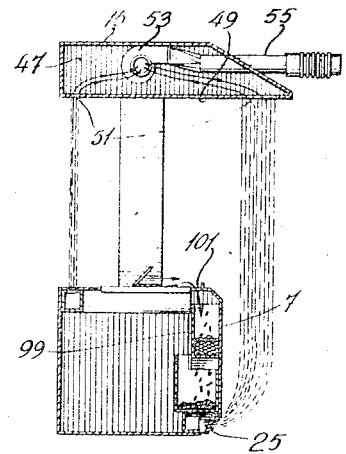
FIG. 4 is a transverse cross-sectional view generally through the center of the unit.

Reference will now be had to FIG. 4 where it will be seen that hood 15 projects forwardly of front wall 7 of base 3 of the unit a substantial distance and that the forward part of opening means 51 through horizontal wall 49 of hood 15 is substantially wider than the lateral openings.

With the above description in mind, it will be easily understood that air is blown into conduit 17 and distributed into the first duct means (U-shaped conduit 19 and straight conduit 23) and withdrawn by means of air exhaust fan 53 through opening means 51 of the second duct means in hood 15. By suitably dimensioning the air conveying ducts, properly dimensioning and distributing openings 21, 27 and 51, it is possible to obtain an air flow moving upwardly from the base to the hood and having such an extent around the hot plate 13 as to practically prevent escape of heat around the unit which would otherwise inconvenience patrons standing around the unit or overheat the immediate surrounding of the unit to generally make the room uncomfortable. It will of course be understood that the exhaust pipe 55 may easily be extended to discharge the hot and fouled air conveniently to the outside.

The heating means for the hot plate 13 may be formed as shown in FIGS. 5 and 6, that is of a series of transverse gas pipes 57 provided with suitable jet openings or other convenient nozzles. These gas pipes 57 may be fed by a pair of headers 59 each supported and fed by vertical standpipes 61 the latter connected to a gas inlet pipe 63 having a threaded end 65 to which may be connected a standard gas line.

The two standpipes 61 have manually operable valves 67 provided with handles 69 projecting through front wall 7 of base 3 as shown in FIG. 1. The quantity of gas to be fed to each of the headers 59 may thus be controlled.

A central pipe 71 interconnects the two valves 67 and feeds into an air valve 73 that can be manually controlled by a wheel 75 outside the unit, forwardly of front wall 7. Air valve 73 feeds the necessary combustion air to the headers 59 through the valves 67.

The inlet pipe 63 may also have an upward nipple 77 inside base 3 to be connected to a propane gas tank, if the latter gas is to be used where conventional city gas is not available.

Figure 8:
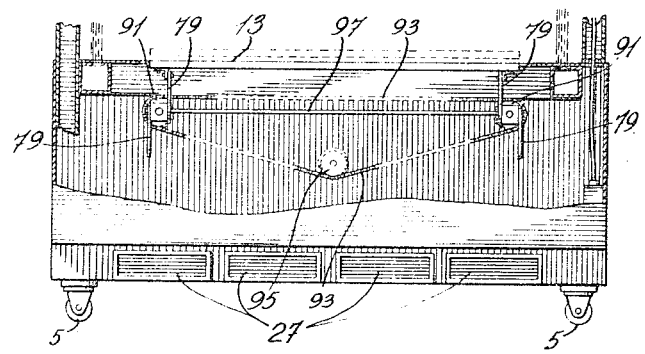
FIG. 8 is a longitudinal cross-sectional view of the base of the unit of the invention intended to show a side view of the hot plate moving means.

Reference will now be had to FIGS. 7 and 8 where there is shown a mechanism for vertically displacing the hot plate 13. The said mechanism is formed of two pairs of links 79, one pair for each end of plate 13. Since the mechanism is the same for both ends of plate 13, only one need be described.

The upper link 79 of each pair is pivotally connected at one end to a block 81 and at the other end to a lug 83 projecting downwardly from plate 13. The lower link of each pair is pivotally connected to block 81 at one end and to the base at the other end such as by being pivotally mounted on a bracket 87.

Blocks 81 are screwed on an operating rod 85 having reversed threads so that when rotated, blocks 81 move relative to one another. Operating rod 85 is mounted for rotation but non-axial displacement in the base 3 and can be manually brought into rotation by a handle wheel 89.

There are thus two operating rods 85 the inner ends of which are provided with sprocket wheels 91 (see FIG. 8) which are interconnected by a sprocket chain 93, the lower strand of which is taut by an idler sprocket 95.

Stiffening rod 97 may interconnect blocks 81 to prevent relative movement thereof longitudinally of the base.

By rotating handle wheel 89, both operating rods 85 are brought into rotation through the sprocket drive abovementioned so that all four blocks 81 are moved relative to one another to thus cause plate 13 to move vertically either upwardly or downwardly.

Forwardly of base 3 and immediately behind front wall 7 is preferably provided a waste collector 99 which is generally triangular in shape, the slanting wall thereof being directed toward one side of the unit. Waste collector 99 has an opening 101 for the reception of such waste as pastry cuttings and thus should stand immediately in front of the hot plate 13 and at about the same level.

Figure 9:
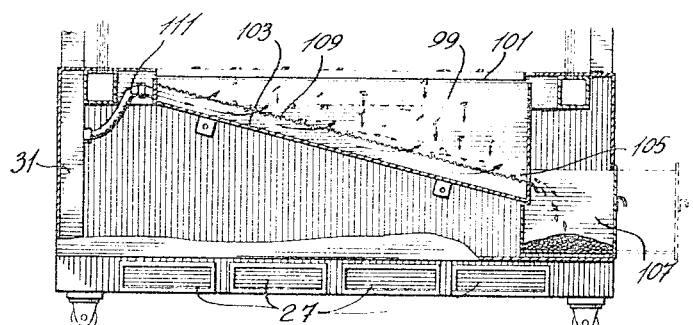
FIG. 9 is also a longitudinal cross-sectional view taken immediately behind the front wall of the base of the unit of the invention and intended to show the pastry cuttings and generally waste removing installation.

As best seen in FIG. 9, a screen 109 is provided near the inclined bottom 103 of the waste collector 99 and an air tube 111 connected at the upper end of collector 99 and into branching air duct 31 to blow air between the inclined bottom 103 and screen 109 to dislodge any waste material and drive it downwardly through an opening 105 and into a receiving box 107 which may be emptied from time to time.

A standard electric lamp 113 (FIG. 5) may be provided through the horizontal wall 49 of hood 15, receiving its electrical power from a standard wall electrical inlet plug 115 which may be connected to any standard 110 electrical outlet. Plug 115 may also be used for delivering electricity to air blower 35 and exhaust fan 53.

From the above description, it will be understood that a very convenient cooking stove has been provided by the instant invention, one that can be easily moved about and yet provide the various necessary services. Furthermore, the unit is provided with means for controlling heat and odors generated by the cooking and means to convey the air to an appropriate place.

Although a specific embodiment of the invention has just been described, it will be understood that various modifications may be made thereto without departing from the spirit of the invention, the scope of which is to be construed from the appended claims only.

I claim:
1. A ventilated cooking stove movable unit, comprising:
 (a) a base;
 (b) a horizontal cooking plate at the top of said base;
 (c) a hood spaced above and over the top of said base;
 (d) first duct means on said base having opening means through a wall thereof surrounding said cooking plate;
 (e) second duct means on said hood having opening means of an outline generally corresponding to the outline of the opening means of said base and located thereover;
 (f) forced air means to blow air into said lower duct means and to withdraw air from said upper duct means whereby to create an air stream flowing from said base to said hood;
 (g) the size and location of said duct means being such as to create an air curtain around said hot plate to prevent heat generated thereby to escape away from said curtain;
 (h) said hot plate being generally rectangular, and
 (i) said first duct means comprising:
  a U-shaped conduit surrounding three sides of said hot plate at substantially the same level, and
  a straight conduit corresponding to the fourth side of said hot plate at the foot of said base.

2. A cooking stove unit as claimed in claim 1, wherein said forced air means comprises:
 an air blower;
 a hollow column supporting said hood over said base and an air conveying means connecting said hollow column to the inlet of said air blower;
 branching air ducts respectively connecting said U-shaped conduit and said straight conduit to said hollow column.

3. A ventilated cooking stove movable unit comprising:
 (a) a wheeled hollow base having a top wall;
 (b) a horizontal cooking plate mounted in an opening in said top wall;
 (c) a hollow hood defining a chamber having a horizontal wall spaced above and over said top wall; said horizontal wall formed with opening means extending therethrough and around the periphery thereof;
 (d) a U-shaped conduit surrounding three sides of said cooking plate beneath said top wall and opening means through said top wall in communication with said U-shaped conduit located below corresponding part of the opening means in said hollow hood horizontal wall;
 (e) a straight conduit at the foot of said base corresponding to the fourth side of said cooking plate and having opening means in correspondence with the remaining part of the opening means of said horizontal wall;
(f) an exhaust fan and an air blower in said hood chamber;
(g) a hollow column supporting said hood over said base and means operatively connecting said hollow column to said air blower;
(h) branching air ducts respectively connecting said U-shaped conduit and said straight conduit to said hollow column, and
(i) air valves in said branching air ducts to control air flow to said U-shaped and straight conduits.

4. A unit as claimed in claim 3, wherein said base has a vertical front wall along said fourth side of said hot plate and said straight conduit is set inwardly of said front wall to define a foot space; said opening means of said straight conduit facing generally forwardly of said front wall; said hood, horizontal wall and portion of the opening means thereof corresponding to said straight conduit projecting beyond said base front wall whereby an air stream created by said blower and exhaust fan flows forwardly of said base front wall.

References Cited by the Examiner
UNITED STATES PATENTS
3,131,687  5/1964  Kalla _____ 126—299

OTHER REFERENCES
Kuppersbusch, German application No. 1,109,342, published June 22, 1961.

CHARLES J. MYHRE, *Primary Examiner.*